United States Patent
Nojiri (10) Patent No.: US 12,204,342 B2
(45) Date of Patent: Jan. 21, 2025

(54) SELF-LOCATION ESTIMATION METHOD AND SELF-LOCATION ESTIMATION DEVICE

(71) Applicant: Nissan Motor Co., Ltd., Yokohama (JP)

(72) Inventor: Takahiro Nojiri, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 271 days.

(21) Appl. No.: 17/265,717

(22) PCT Filed: Aug. 8, 2018

(86) PCT No.: PCT/JP2018/029792
§ 371 (c)(1),
(2) Date: Feb. 3, 2021

(87) PCT Pub. No.: WO2020/031295
PCT Pub. Date: Feb. 13, 2020

(65) Prior Publication Data
US 2021/0191423 A1   Jun. 24, 2021

(51) Int. Cl.
*G05D 1/00* (2024.01)
*G06V 20/58* (2022.01)

(52) U.S. Cl.
CPC ......... *G05D 1/0274* (2013.01); *G05D 1/0212* (2013.01); *G06V 20/582* (2022.01); *G06V 2201/07* (2022.01)

(58) Field of Classification Search
CPC .............. G05D 1/0274; G05D 1/0212; G05D 2201/0213; G06V 20/582; G06V 2201/07; G06V 20/588; G01C 21/30
See application file for complete search history.

(56) References Cited

U.S. PATENT DOCUMENTS

| | | | |
|---|---|---|---|
| 9,062,979 B1 * | 6/2015 | Ferguson | G01S 17/875 |
| 9,812,015 B1 * | 11/2017 | Cox | G08G 1/147 |
| 9,980,246 B2 * | 5/2018 | Pattabiraman | H04W 4/021 |

(Continued)

FOREIGN PATENT DOCUMENTS

| | | | |
|---|---|---|---|
| JP | 2004-045227 A | | 2/2004 |
| JP | 2006275619 A | * | 10/2006 |

(Continued)

OTHER PUBLICATIONS

Machine Translation of JP 2006275619 A obtained from Clarivate Analytics on Nov. 18, 2023 (Year: 2006).*

*Primary Examiner* — Thomas Ingram
*Assistant Examiner* — Michael J Herrera
(74) *Attorney, Agent, or Firm* — Young Basile Hanlon & MacFarlane, P.C.

(57) ABSTRACT

A self-location estimation method includes detecting a traffic sign in a vicinity of a vehicle; determining a current location of the vehicle; acquiring height information of the detected traffic sign from map data in which two-dimensional coordinate information and height information of a traffic sign existing in a vicinity of a road are recorded, based on a relative location of the detected traffic sign with respect to the vehicle and the current location; and estimating a height at which the vehicle is present according to the height information acquired from the map data.

12 Claims, 5 Drawing Sheets

(56) References Cited

U.S. PATENT DOCUMENTS

| | | | |
|---|---|---|---|
| 2006/0217879 A1* | 9/2006 | Ikeuchi | G01C 21/3844 701/409 |
| 2007/0073524 A1* | 3/2007 | Song | G01C 21/20 703/2 |
| 2009/0228204 A1* | 9/2009 | Zavoli | G01C 21/30 701/532 |
| 2011/0307169 A1* | 12/2011 | Shimizu | G01C 21/30 382/113 |
| 2011/0313648 A1* | 12/2011 | Newson | G01C 21/3484 701/447 |
| 2013/0332063 A1 | 12/2013 | Pirwani et al. | |
| 2015/0233720 A1* | 8/2015 | Harada | G06V 20/56 701/409 |
| 2015/0345974 A1* | 12/2015 | Takahashi | G01C 21/3602 701/461 |
| 2016/0097644 A1* | 4/2016 | Strassenburg-Kleciak | G01C 21/30 701/461 |
| 2016/0188996 A1* | 6/2016 | Modica | G06F 16/50 382/203 |
| 2016/0306051 A1* | 10/2016 | Hirabayashi | G01C 21/3667 |
| 2017/0010618 A1* | 1/2017 | Shashua | B60W 60/00 |
| 2017/0074964 A1* | 3/2017 | Xu | G01S 13/74 |
| 2017/0329019 A1* | 11/2017 | Croyle | G01S 19/47 |

FOREIGN PATENT DOCUMENTS

| | | |
|---|---|---|
| JP | 2006-317286 A | 11/2006 |
| JP | 2007-108043 A | 4/2007 |
| JP | 2010-049391 A | 3/2010 |
| WO | 2018113451 A1 | 6/2018 |

* cited by examiner

SELF-LOCATION ESTIMATION METHOD AND SELF-LOCATION ESTIMATION DEVICE

TECHNICAL FIELD

The present invention relates to a self-location estimation method and a self-location estimation device.

BACKGROUND

In JP 2006-317286 A, a technology for determining whether the current location of a vehicle is on an ordinary road or an expressway, based on whether, in an image of the vicinity of the vehicle captured by a camera, an ordinary road identifying image for identifying that the vehicle is traveling on an ordinary road or an expressway identifying image for identifying that the vehicle is traveling on an expressway is included is described.

SUMMARY

Although the technology described in JP 2006-317286 A is capable of discriminating between roads the road types of which are different from each other, the technology is incapable of discriminating between different roads the road types of which are the same.

Thus, when different roads the road types of which are the same respectively exist at different altitudes and the two-dimensional locations of the roads are close to each other, it sometimes becomes impossible to determine on which one of the roads the vehicle is present.

An object of the present invention is to enable determination of on which one of roads existing at different altitudes a vehicle is present.

According to one aspect of the present invention, there is provided a self-location estimation method including: detecting a traffic sign in a vicinity of a vehicle; determining a current location of the vehicle; acquiring altitude information of the detected traffic sign from map data in which two-dimensional coordinate information and altitude information of a traffic sign existing in a vicinity of a road are recorded, based on a relative location of the detected traffic sign with respect to the vehicle and the current location; and estimating a an altitude at which the vehicle is present according to the altitude information acquired from the map data.

According to the aspect of the present invention, it is possible to determine on which one of roads existing at different altitudes a vehicle is present.

The object and advantages of the invention will be realized and attained by means of the elements and combinations particularly pointed out in the claims. It is to be understood that both the foregoing general description and the following detailed description are exemplary and explanatory and are not restrictive of the invention.

DETAILED DESCRIPTION

An embodiment of the present invention will now be described with reference to the drawings.
(Configuration)

Figure 1:
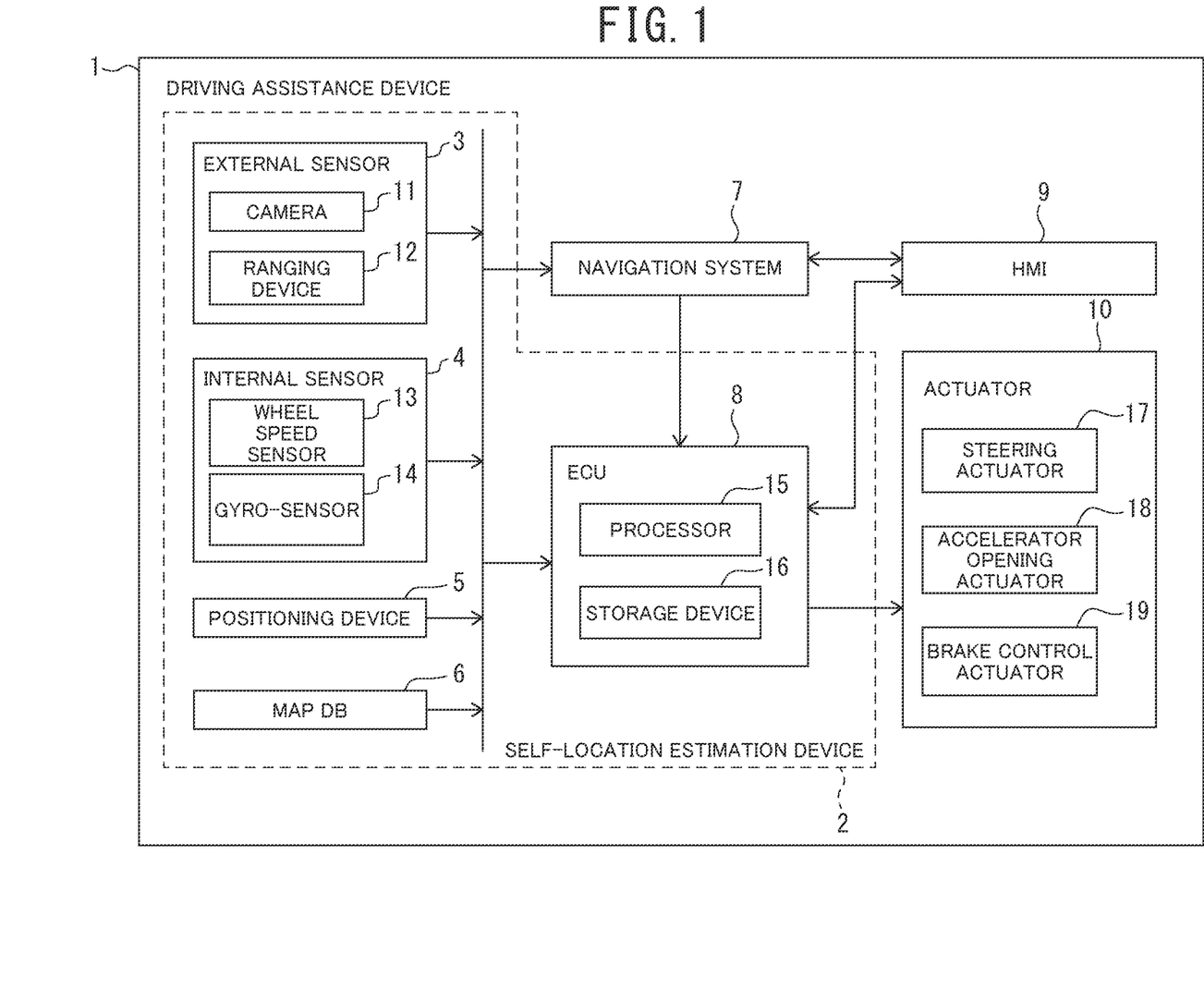
FIG. 1 is a schematic configuration diagram of an example of a driving assistance device of an embodiment.

FIG. 1 is now referred to. A driving assistance device 1 performs automatic-driving control for making a vehicle (hereinafter, referred to as "vehicle") on which the driving assistance device 1 is mounted automatic-drive without involvement of a driver and driving assistance control for assisting a driver in driving the vehicle, based on a travel environment in the surroundings of the vehicle.

The driving assistance control may include not only travel control, such as automatic-steering, automatic-braking, constant speed traveling control, and lane keeping control, but also outputting a message prompting the driver to perform a steering operation or a deceleration operation.

The driving assistance device 1 includes external sensors 3, internal sensors 4, a positioning device 5, a map database 6, a navigation system 7, an electronic control unit (ECU) 8, a human machine interface (HMI) 9, and actuators 10. Note that a map database is denoted as "map DB" in attached drawings.

The external sensors 3 are sensors that detect a surrounding environment around the vehicle, such as an object in the surroundings of the vehicle. The external sensors 3 may include a camera 11 and a ranging device 12. The camera 11 and the ranging device 12 detect a surrounding environment around the vehicle, such as objects existing in the surroundings of the vehicle (for example, another vehicle, a pedestrian, white lines such as a lane boundary line and a lane marking, and ground objects that are installed on a road or in the vicinity of the road, such as a traffic light, a stop line, a traffic sign, a building, a utility pole, a curb, and a crosswalk), relative locations of such objects with respect to the vehicle, relative distances between the vehicle and the objects, and the like.

The camera 11 may be, for example, a stereo camera. The camera 11 may be composed of monocular cameras, and, by capturing images of an identical object from a plurality of perspectives using the monocular cameras, a distance to the object may be calculated. The distance to the object may be calculated based on a ground contact position of the object detected from captured images captured by the monocular cameras.

The ranging device 12 may be, for example, a laser range-finder (LRF) or a radar.

The camera 11 and the ranging device 12 output surrounding environment information, which is information on the detected surrounding environment, to the ECU 8 and the navigation system 7.

The internal sensors 4 are sensors that detect a travel state of the vehicle. The internal sensors 4 may include, for example, a wheel speed sensor 13 and a gyro-sensor 14.

The wheel speed sensor 13 detects a wheel speed of the vehicle. The gyro-sensor 14 detects a pitch angular velocity, a roll angular velocity, and a yaw angular velocity of the vehicle. The wheel speed sensor 13 and the gyro-sensor 14 output travel state information, which is information on the detected travel state, to the ECU 8 and the navigation system 7.

The positioning device 5 receives radio waves from a plurality of navigation satellites and thereby acquires a current location of the vehicle and outputs the acquired current location of the vehicle to the ECU 8 and the navigation system 7. The positioning device 5 may have, for example, a global positioning system (GPS) receiver or another global navigation satellite system (GNSS) receiver other than a GPS receiver.

The map database 6 stores road map data. The road map data include shapes (lane shapes) and two-dimensional coordinates (for example, latitude and longitude) of white lines, such as lane boundary lines and lane markings, altitudes of roads and white lines, two-dimensional coordinate information (for example, latitude and longitude) and altitude information of ground objects that are installed on roads and in the vicinities of the roads, such as traffic lights, stop lines, traffic signs, buildings, utility poles, curbs, and crosswalks.

The road map data may also include information on road types, gradients of roads, the numbers of lanes, legal velocities (velocity limits), road widths, presence or absence of junctions, and the like. In the road types, for example, an ordinary road and an expressway may be included.

The map database 6 is referred to by the ECU 8 and the navigation system 7.

The navigation system 7 performs route guidance to a destination that is set on a map by the driver of the vehicle for a passenger on the vehicle. The navigation system 7 estimates a current location of the vehicle, using various types of information input from the external sensors 3, the internal sensors 4, and the positioning device 5, generates a route to the destination, and performs route guidance for a passenger. The navigation system 7 outputs the route information to the ECU 8.

The ECU 8 estimates a current location of the vehicle and sets a target travel trajectory on which the vehicle is required to travel, based on the estimated current location, the road map data in the map database 6, the route information output from the navigation system 7, the surrounding environment, and the travel state of the vehicle. The ECU 8 performs automatic-driving control and driving assistance control of the vehicle, based on the set target travel trajectory, and drives the actuators 10 and thereby controls travel of the vehicle.

The external sensors 3, the internal sensors 4, the positioning device 5, the map database 6, and the ECU 8 constitute a self-location estimation device 2 according to the embodiment.

The ECU 8 includes a processor 15 and peripheral components, such as a storage device 16. The processor 15 may be, for example, a central processing unit (CPU) or a micro-processing unit (MPU).

The storage device 16 may include a semiconductor storage device, a magnetic storage device, and an optical storage device. The storage device 16 may include registers, a cache memory, and a memory, such as a read only memory (ROM) and a random access memory (RAM), that are used as a main storage device.

Note that the ECU 8 may be achieved by a functional logic circuit that is implemented in a general-purpose semiconductor integrated circuit. For example, the ECU 8 may include a programmable logic device (PLD), such as a field-programmable gate array (FPGA), and the like.

The HMI 9 is an interface for inputting and outputting information between a passenger on the vehicle and the navigation system 7 and ECU 8.

The HMI 9 may accept, for example, an input operation of inputting a destination to the navigation system 7 that is performed by the passenger. The HMI 9 may, for example, output driving guidance given by the navigation system 7 or road guidance information based on the road map data of the surroundings of the vehicle.

The actuators 10 operate the steering wheel, accelerator opening, and a braking device of the vehicle according to a control signal output from the ECU 8 and thereby generate vehicle behavior of the vehicle.

The actuators 10 include a steering actuator 17, an accelerator opening actuator 18, and a brake control actuator 19.

The steering actuator 17 controls steering direction and the amount of steering of the vehicle. The accelerator opening actuator 18 controls the accelerator opening of the vehicle. The brake control actuator 19 controls braking action of the braking device of the vehicle.

Figure 2:
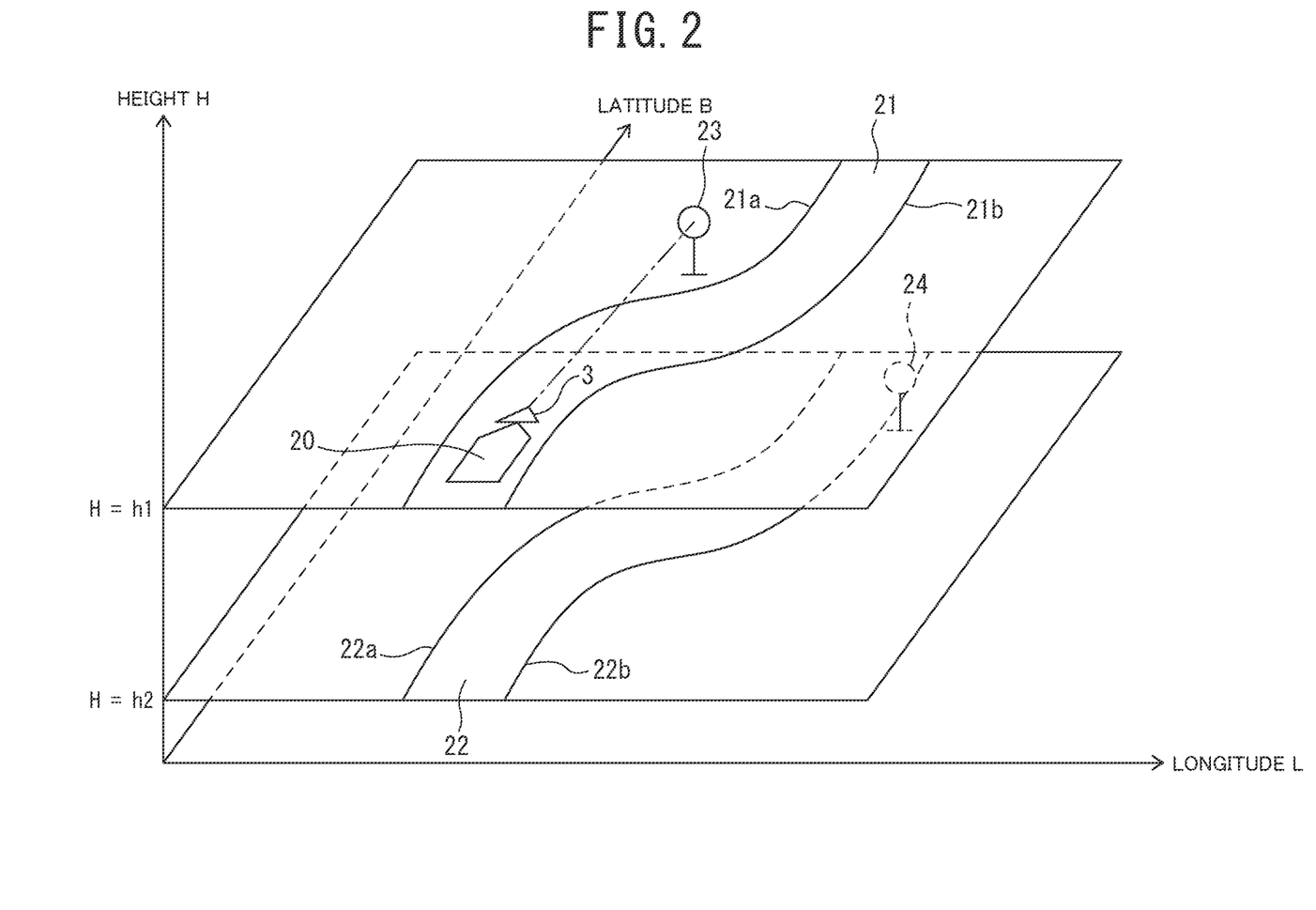
FIG. 2 is an explanatory diagram of an example of a self-location estimation method of the embodiment.

Next, outline of self-location estimation processing performed by the ECU 8 will be described. FIG. 2 is now referred to. The reference numeral 20 indicates a vehicle on which the driving assistance device 1 is mounted. The reference numerals 21 and 22 indicate roads existing at different altitudes h1 and h2, respectively, the reference numerals 21a and 21b indicate lane boundary lines (white lines) on the road 21, and the reference numerals 22a and 22b indicate lane boundary lines (white lines) on the road 22. A case where the vehicle 20 is present on the road 21 is now assumed.

When the two-dimensional locations of the roads 21 and 22 that exist at different altitudes are close to each other, it becomes impossible to determine on which road the vehicle 20 is present only from the two-dimensional coordinate information.

Although it is conceivable that, in order to estimate a self-location including altitude, map matching is performed in a three-dimensional space (for example, a space represented by latitude, longitude, and altitude), the three-dimensional map matching requires a high computational cost. Therefore, it is preferable to be able to estimate a self-location including altitude without performing three-dimensional map matching. As an estimation technology of a self-location, dead reckoning based on wheel speed and angular velocity has been known.

However, in the self-location estimation using the dead reckoning, error caused by measurement error accumulates. Therefore, it is necessary to acquire an observed value of altitude from some information source and correct an estimated value calculated using the dead reckoning with the observed value.

Thus, the driving assistance device 1 acquires altitude information of a traffic sign 23 in the vicinity of the vehicle 20 that is installed on the road 21 from the map database and estimates an altitude at which the vehicle 20 is present, based on the altitude information of the traffic sign 23.

Specifically, a relative location of the traffic sign 23 with respect to the vehicle 20 is detected using the external sensors 3. The ECU 8 determines a current location of the vehicle 20. For example, the ECU 8 estimates the current location of the vehicle 20, using the dead reckoning, based on the wheel speed detected by the wheel speed sensor 13 and the pitch angular velocity, the roll angular velocity, and the yaw angular velocity detected by the gyro-sensor 14. For example, the ECU 8 may measure the current location of the vehicle 20, using the positioning device 5.

The ECU 8 acquires altitude information of the traffic sign 23 from the map database 6 in which two-dimensional coordinate information (for example, longitude and latitude) and altitude information of traffic signs 23 and 24 existing in the vicinities of the roads are recorded, based on the two-dimensional coordinates of the current location of the vehicle 20 and the relative location of the traffic sign 23.

The ECU 8 estimates an altitude at which the vehicle 20 is present, based on the altitude information acquired from the map database 6. For example, the ECU 8 estimates an altitude indicated by the altitude information acquired from the map database 6 as the altitude at which the vehicle 20 is present.

Correcting an estimated value of the altitude calculated using the dead reckoning with the altitude estimated in this manner enables error caused by measurement error to be prevented from accumulating.

In addition, since the altitude can be estimated without performing three-dimensional map matching, it is possible to keep the computational cost low.

Further, since the altitude is estimated based on the coordinate information of the traffic sign 23 recorded in the map database 6, it is possible to correctly estimate the altitude at which the vehicle 20 is present even when separate roads of the same road type respectively exist at different altitudes and the two-dimensional locations of the roads are close to each other.

Note that, as illustrated in FIG. 2, the traffic sign 24 is installed on the road 22, which exists at an altitude different from the altitude of the road 21 on which the vehicle 20 is present, as well. However, since the traffic sign 24 is shielded from the vehicle 20 on the road 21 by the road structure, the external sensors 3 cannot detect the traffic sign 24. Therefore, erroneously estimating the altitude at which the vehicle 20 is present based on the altitude information of the traffic sign 24, which is installed on the road 22 that is different from the road 21, never occurs. Thus, the altitude information of a traffic sign does not necessarily have to be a numerical value representing an altitude, and it may be configured to acquire information indicating on which one of roads that are close to each other the traffic sign is installed. For example, when the traffic sign 23 is detected, it is possible to acquire information indicating that the installation location of the traffic sign 23 is on the road 21 and determine that the vehicle 20 is traveling on one existing at a higher altitude of the roads that are close to each other. On the other hand, when the traffic sign 24 is detected, it is possible to acquire information indicating that the installation location of the traffic sign 24 is on the road 22 and determine that the vehicle 20 is traveling on the other existing at a lower altitude of the roads that are close to each other.

Next, a functional configuration of the ECU 8 will be described with reference to FIG. 3. The ECU 8 includes a self-location estimation unit 30, a target trajectory setting unit 31, and a travel control unit 32. Functions of the self-location estimation unit 30, the target trajectory setting unit 31, and the travel control unit 32 may be achieved by, for example, the processor 15 of the ECU 8 executing computer programs stored in the storage device 16.

The self-location estimation unit 30 estimates a self-location of the vehicle, based on various information input from the external sensors 3, the internal sensors 4, and the positioning device 5 and information acquired with reference to the map database 6.

The self-location estimation unit 30 includes a dead reckoning unit 40, a map matching unit 41, a traffic sign detection unit 42, a coordinate calculation unit 43, and an altitude information acquisition unit 44.

The dead reckoning unit 40 calculates a predicted location of the vehicle at a present time point, using the dead reckoning based on the wheel speed, the pitch angular velocity, the roll angular velocity, and the yaw angular velocity detected by the internal sensors 4. The predicted location of the vehicle includes two-dimensional coordinates, an altitude, and an azimuth of the forward direction of the vehicle.

The dead reckoning unit 40 outputs the calculated predicted location to the map matching unit 41.

In this processing, the dead reckoning unit 40 calculates two-dimensional coordinates in a two-dimensional coordinate system used in the map database 6. Hereinafter, the two-dimensional coordinate system used in the map database 6 is referred to as "map coordinate system".

Although, in the following description, an example in which the two-dimensional coordinate system used in the map database 6 is a geographical coordinate system in which the coordinates are represented by latitude and longitude will be described, the two-dimensional coordinate system is not limited to the geographical coordinate system and another coordinate system, such as a plane rectangular coordinate system and a polar coordinate system, may be used.

The map matching unit 41 calculates, based on the relative locations of ground objects in the surroundings of the vehicle and relative locations of white lines, which are detected by the external sensors 3, and the predicted location of the vehicle, which is calculated by the dead reckoning unit 40, two-dimensional coordinates in the map coordinate system of the ground objects and the white lines.

The map matching unit 41 matches the two-dimensional coordinates of the ground objects and the white lines with the map database 6, using two-dimensional map matching and calculates a mapping correction value of the vehicle location with respect to each of latitude, longitude, and azimuth.

The map matching unit 41 corrects the predicted location of the vehicle, which is calculated by the dead reckoning unit 40, with the calculated mapping correction values and thereby acquires an estimated value of the current location of the vehicle.

The map matching unit 41 outputs the estimated value of the current location of the vehicle to the coordinate calculation unit 43 and the target trajectory setting unit 31.

The traffic sign detection unit 42 detects a relative location of a traffic sign, which is detected by the external sensors 3, in the vicinity of the vehicle with respect to the vehicle. The X-coordinate and the Y-coordinate of the relative location of a traffic sign are denoted as "TS_X [m]" and "TS_Y [m]", respectively.

The traffic sign detection unit 42 outputs the relative location of the traffic sign to the coordinate calculation unit 43.

The coordinate calculation unit 43 calculates estimated values of the two-dimensional coordinates of the traffic sign in the map coordinate system.

Figure 4:
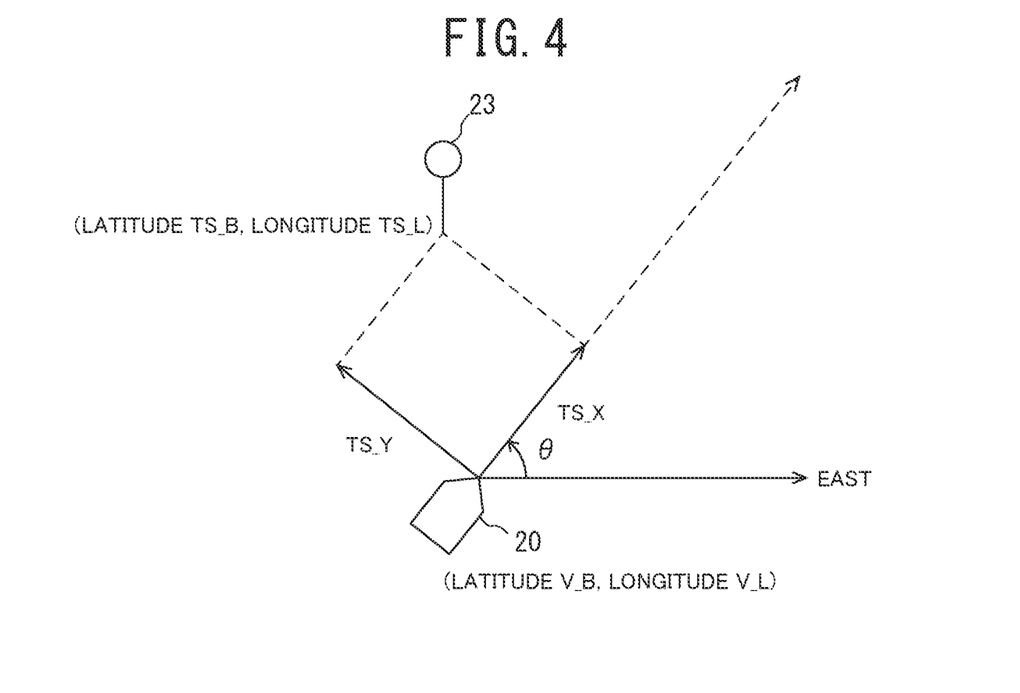
FIG. 4 is an explanatory diagram of an example of a calculation method of two-dimensional coordinates of a traffic sign.

As illustrated in FIG. 4, latitude and longitude of the traffic sign are denoted as "TS_B [rad]" and "TS_L [rad]", respectively.

The latitude and the longitude of the estimated value of the current location of the vehicle and the azimuth of the forward direction of the vehicle, which are acquired by the map matching unit 41, are denoted as "V_B [rad]", "V_L [rad]", and "θ [rad]", respectively.

The coordinate calculation unit 43 calculates estimated values of the two-dimensional coordinates (TS_B [rad], TS_L [rad]) of the traffic sign by approximation in accordance with the formulae (1) and (2) below.

$$TS\_B = V\_B + (TS\_X \sin\theta + TS\_Y \cos\theta)/M \quad (1)$$

$$TS\_L = V\_L + (TS\_X \cos\theta - TS\_Y \sin\theta)/(N \cos V\_B) \quad (2)$$

In the above formulae, M denotes radius of curvature of the meridian [m] and N denotes radius of curvature of the prime vertical [m] at a latitude V_B.

The coordinate calculation unit 43 outputs the estimated values of the two-dimensional coordinates (TS_B [rad], TS_L [rad]) of the traffic sign to the altitude information acquisition unit 44.

The altitude information acquisition unit 44 matches the two-dimensional coordinates (TS_B [rad], TS_L [rad]) of the traffic sign calculated by the coordinate calculation unit 43 with the two-dimensional coordinate information of traffic signs recorded in the map database 6.

When a traffic sign that has two-dimensional coordinate information that matches the two-dimensional coordinates (TS_B [rad], TS_L [rad]), which are calculated by the coordinate calculation unit 43, exists in the map database 6, the altitude information acquisition unit 44 acquires the coordinate information (latitude TS_M_B [rad], longitude TS_M_L [rad], and altitude TS_M_H [m]) of the matching traffic sign from the map database 6.

In the above processing, cases where the two-dimensional coordinates (TS_B [rad], TS_L [rad]) and the two-dimensional coordinates (TS_M_B [rad], TS_M_L [rad]) match each other include not only a case where the two two-dimensional coordinates completely coincide with each other but also a case where a difference between the two two-dimensional coordinates is less than a predetermined value.

The altitude information (TS_M_H [m]) of a traffic sign may be altitude information of the ground (that is, the base) at the installation point of the traffic sign or altitude information of the sign plate of the traffic sign.

Note that a traffic sign the altitude information of which is to be acquired may be, for example, an information sign, a danger warning sign, a regulatory sign, or a direction sign.

The altitude information acquisition unit 44 estimates that the altitude at which the vehicle is present is a height an altitude that the altitude information of the traffic sign acquired from the map database 6 indicates. The altitude information acquisition unit 44 may update the estimated value of the altitude at which the vehicle is present, using a Kalman filter, based on altitude information of the traffic sign that is acquired multiple times at different time points.

The altitude information acquisition unit 44 outputs the estimated altitude at which the vehicle is present to the dead reckoning unit 40 and the target trajectory setting unit 31.

The dead reckoning unit 40 corrects the predicted value of the altitude at which the vehicle is present that is calculated using the dead reckoning, according to the altitude estimated by the altitude information acquisition unit 44. For example, the dead reckoning unit 40 corrects (overwrites) the predicted value of the altitude at which the vehicle is present, which is calculated using the dead reckoning, with the altitude estimated by the altitude information acquisition unit 44 and calculates a subsequent predicted location of the vehicle, based on the corrected altitude.

The dead reckoning unit 40 may correct the predicted value of the altitude at which the vehicle is present, which is calculated using the dead reckoning, according to the altitude estimated by the altitude information acquisition unit 44 every time the vehicle travels a predetermined distance. This configuration enables error of the dead reckoning that accumulates according to travel distance to be efficiently corrected.

The target trajectory setting unit 31 sets a target travel trajectory on which the vehicle is required to travel, based on the current location of the vehicle estimated by the map matching unit 41, the road map data in the map database 6, the route information output from the navigation system 7, the surrounding environment detected by the external sensors 3, and the travel state of the vehicle detected by the internal sensors 4.

On this occasion, the target trajectory setting unit 31 determines a road on which the vehicle is present based on the two-dimensional coordinates of the current location of the vehicle estimated by the map matching unit 41 and the altitude at which the vehicle is present estimated by the altitude information acquisition unit 44. For example, when a plurality of roads the altitudes of which are different from each other exist at the two-dimensional coordinates of the current location of the vehicle, the target trajectory setting unit 31 determines on which one of the plurality of roads the vehicle is present, based on the altitude at which the vehicle is present that is estimated by the altitude information acquisition unit 44.

The target trajectory setting unit 31 sets a target travel trajectory in which the vehicle travels on the road on which the vehicle is present in accordance with the route generated by the navigation system 7.

The target trajectory setting unit 31 outputs the set target travel trajectory to the travel control unit 32.

The travel control unit 32 performs the automatic-driving control and the driving assistance control of the vehicle by driving the actuators 10 in such a way that the vehicle travels on the travel trajectory generated by the target trajectory setting unit 31 and thereby operating a steering mechanism, an acceleration mechanism, and a brake mechanism of the vehicle.

(Operation)

Next, an example of a driving assistance method of the embodiment will be described with reference to FIG. 5.

Figure 3:
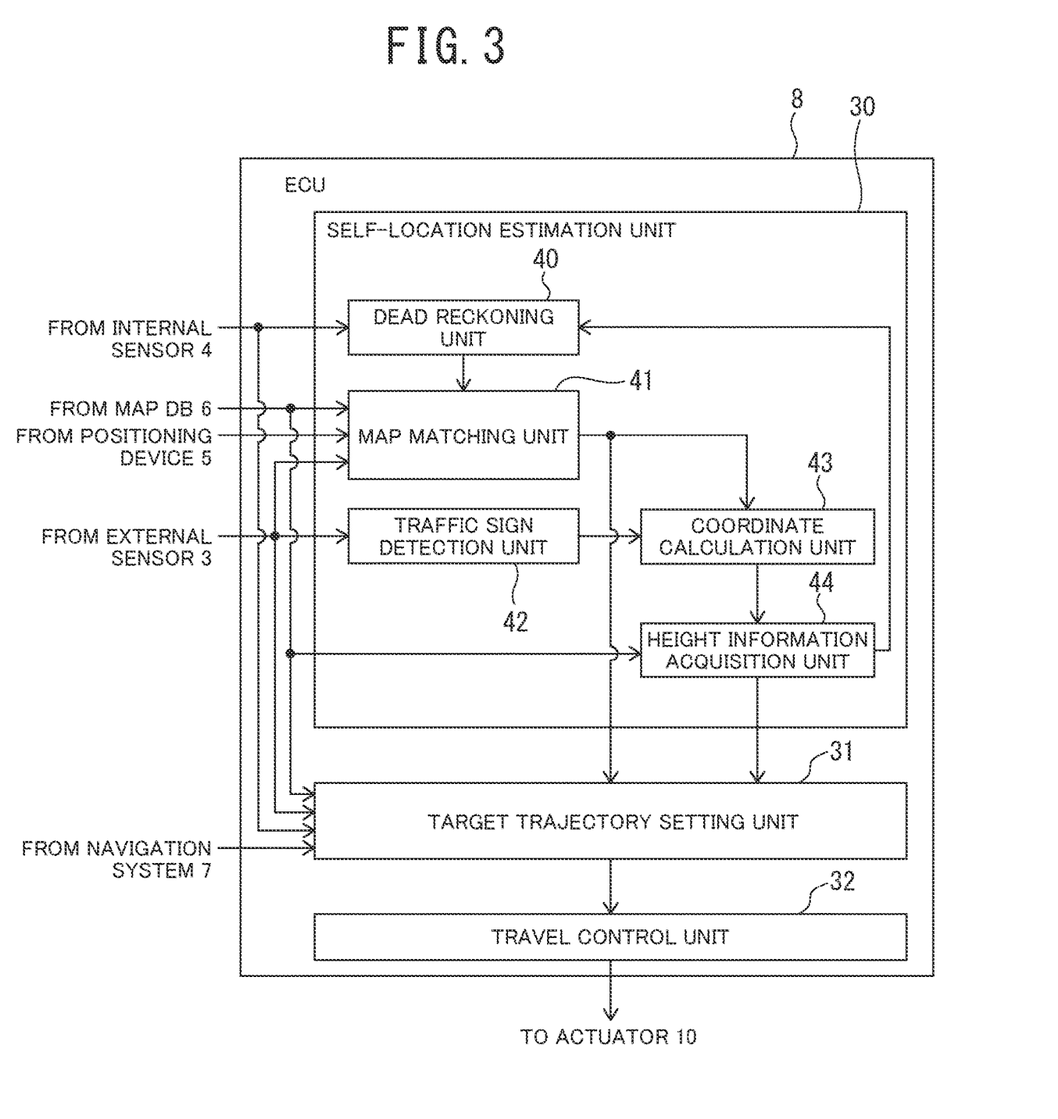
FIG. 3 is a block diagram illustrative of an example of a functional configuration of an electronic control unit (ECU) illustrated in FIG. 1.

In step S1, the self-location estimation unit 30 in FIG. 3 performs the self-location estimation processing of estimating a current location of the vehicle.

Figure 6:
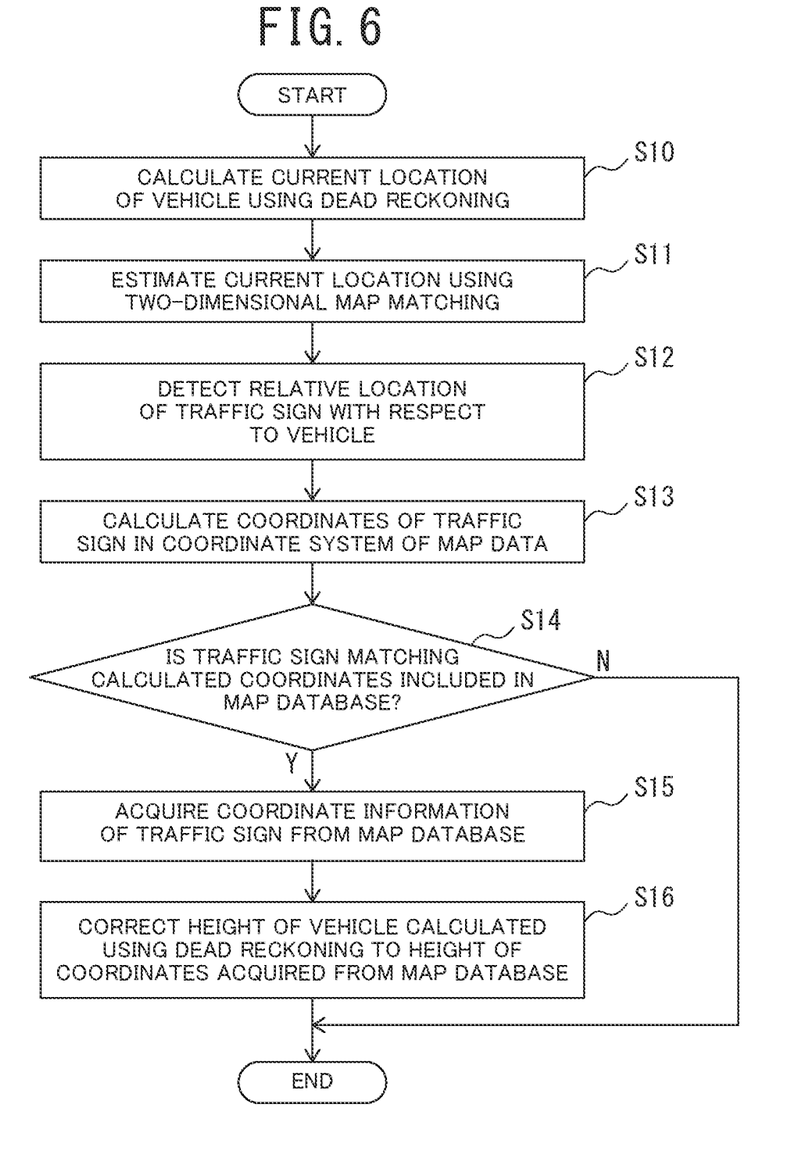
FIG. 6 is a flowchart of an example of a self-location estimation method illustrated in FIG. 5.

FIG. 6 is a flowchart of an example of the self-location estimation processing S1.

In step S10, the dead reckoning unit 40 calculates a predicted location (latitude, longitude, altitude, and azimuth) of the vehicle at a present time point, using the dead reckoning based on the wheel speed, the pitch angular velocity, the roll angular velocity, and the yaw angular velocity detected by the internal sensors 4.

In step S11, the map matching unit 41 calculates, based on the relative locations of the ground objects in the surroundings of the vehicle and the relative locations of the white lines, which are detected by the external sensors 3, the predicted location of the vehicle, which was calculated by the dead reckoning unit 40, and the map database 6, an estimated value of the current location of the vehicle, using the two-dimensional map matching.

In step S12, the traffic sign detection unit 42 detects a relative location (TS_X [m], TS_Y [m]) of the traffic sign, which is detected by the external sensors 3, in the surroundings of the vehicle with respect to the vehicle.

In step S13, the coordinate calculation unit 43 calculates estimated values (TS_B [rad], TS_L [rad]) of the two-dimensional coordinates of the traffic sign in the map coordinate system.

In step S14, the altitude information acquisition unit 44 matches the two-dimensional coordinates (TS_B [rad], TS_L [rad]) of the traffic sign calculated in step S13 with the two-dimensional coordinate information of traffic signs recorded in the map database 6. The altitude information acquisition unit 44 determines whether or not a traffic sign that has two-dimensional coordinate information matching the two-dimensional coordinates (TS_B [rad], TS_L [rad]) exists in the map database 6.

When no traffic sign the two-dimensional coordinates of which match the two-dimensional coordinates (TS_B [rad], TS_L [rad]) exists in the map database 6 (step S14: N), the self-location estimation processing S1 is terminated without correcting the altitude calculated using the dead reckoning.

When a traffic sign the two-dimensional coordinates of which match the two-dimensional coordinates (TS_B [rad TS_L [rad]) exists in the map database 6 (step S14: Y), the process proceeds to step S15.

In step S15, the altitude information acquisition unit 44 acquires the coordinate information (latitude TS_M_B [rad], longitude TS_M_L [rad], and altitude TS_M_H [m]) of the traffic sign the two-dimensional coordinates of which match the two-dimensional coordinates (TS_B [rad], TS_L [rad]) from the map database 6. The altitude information acquisition unit 44 estimates that the altitude at which the vehicle is present is the altitude (TS_M_H [m]) of the traffic sign.

In step S16, the dead reckoning unit 40 corrects the predicted value of the altitude at which the vehicle is present, which was calculated using the dead reckoning, to the altitude estimated by the altitude information acquisition unit 44. Subsequently, the self-location estimation processing S1 is terminated.

Figure 5:
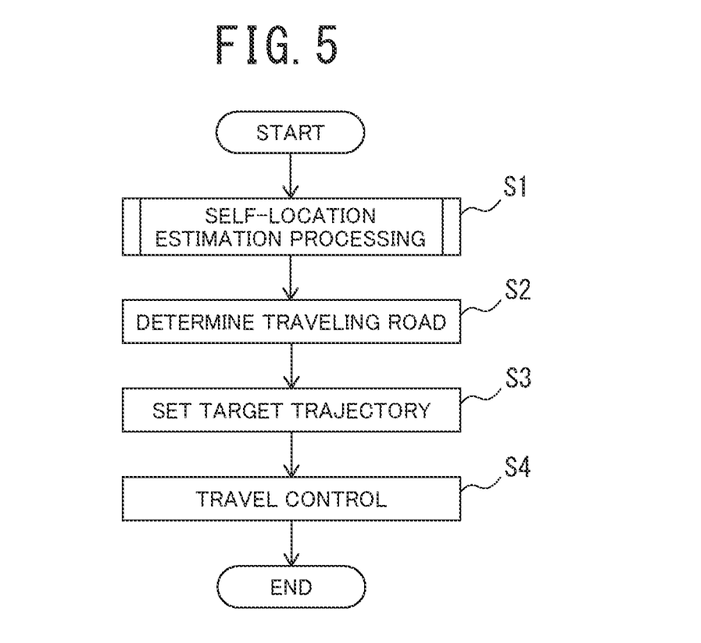
FIG. 5 is a flowchart of an example of a driving assistance method of the embodiment.

FIG. 5 is now referred to. In step S2, the target trajectory setting unit 31 determines a road on which the vehicle is present based on the two-dimensional coordinates of the current location of the vehicle, which was estimated by the map matching unit 41, and the altitude at which the vehicle is present, which was estimated by the altitude information acquisition unit 44.

When a plurality of roads the altitudes of which are different from each other exist at the two-dimensional coordinates of the current location of the vehicle, the target trajectory setting unit 31 determines on which one of the plurality of roads the vehicle is present, based on the altitude at which the vehicle is present, which was estimated by the altitude information acquisition unit 44. Note that the altitude information of the vehicle is only required to be information that enables on which one of a plurality of roads the altitudes of which are different from each other the vehicle is present at the two-dimensional coordinates of the current location of the vehicle to be determined. For example, the altitude information of the vehicle may be information that indicates on which one of a plurality of different roads a traffic sign, among traffic signs respectively installed on the plurality of roads, that the traffic sign detected by the vehicle matches is installed.

In step S3, the target trajectory setting unit 31 sets a target travel trajectory in which the vehicle travels on the road on which the vehicle is currently present, based on the current location of the vehicle, which was estimated by the map matching unit 41, the road map data in the map database 6, the route information output from the navigation system 7, the surrounding environment detected by the external sensors 3, and the travel state of the vehicle detected by the internal sensors 4.

On this occasion, the target trajectory setting unit 31 sets a target travel trajectory in which the vehicle travels on the road on which the vehicle is present, which was determined in step S2, in accordance with the route generated by the navigation system 7.

In step S4, the travel control unit 32 performs travel control, such as the automatic-driving control and the driving assistance control, of the vehicle by driving the actuators 10 in such a way that the vehicle travels on the travel trajectory that was generated by the target trajectory setting unit 3.

Advantageous Effects of Embodiment (1) The traffic sign detection unit 42 detects a traffic sign in the vicinity of the vehicle. The dead reckoning unit 40 and the map matching unit 41 determine a current location of the vehicle. The coordinate calculation unit 43 and the altitude information acquisition unit 44 acquire the altitude information of the detected traffic sign from the map database 6, based on the relative location of the detected traffic sign with respect to the vehicle and the current location and estimate a height an altitude at which the vehicle is present according to the altitude information.

Since this processing enables the altitude at which the vehicle is present to be estimated, it becomes possible to determine on which one of roads existing at different altitudes the vehicle is present.

In particular, since the altitude is estimated based on the coordinate information of the traffic sign 23 recorded in the map database 6, it is possible to correctly estimate the altitude at which the vehicle 20 is present even when roads of the same road type respectively exist at different altitudes and the two-dimensional locations of the roads are close to each other.

(2) The dead reckoning unit 40 and the map matching unit 41 determine two-dimensional coordinates of the current location in the map coordinate system. The coordinate calculation unit 43 calculates two-dimensional coordinates of the detected traffic sign in the map coordinate system, based on the two-dimensional coordinates of the relative location of the detected traffic sign and the current location. The altitude information acquisition unit 44 acquires the altitude information of a traffic sign that has two-dimensional coordinate information corresponding to the two-dimensional coordinates of the detected traffic sign from the map database 6 as the altitude information of the detected traffic sign.

This processing enables the altitude information of the traffic sign detected in the vicinity of the vehicle to be appropriately acquired from the map database 6, in which two-dimensional coordinate information and altitude information of traffic signs existing in the vicinities of roads are recorded.

(3) The map matching unit 41 calculates two-dimensional coordinates of the current location in the map coordinate system, using two-dimensional map matching.

That is, the map matching unit 41 calculates two-dimensional coordinates of the current location, using two-dimensional map matching and estimates an altitude at which the vehicle is present, based on the coordinate information of the traffic sign 23 recorded in the map database 6. Since, because of this configuration, a self-location including altitude can be estimated without performing three-dimensional map matching, it is possible to keep the computational cost low.

(4) The dead reckoning unit 40 corrects the estimated value of the altitude at which the vehicle is present, which is calculated using dead reckoning, according to the altitude information acquired from the map database 6.

This configuration enables error in the altitude caused by measurement error to be prevented from accumulating.

(5) The dead reckoning unit 40 corrects the estimated value according to the altitude information acquired from the map database every time the vehicle travels a predetermined distance.

This configuration enables error of the dead reckoning, which accumulates as travel distance increases, to be efficiently corrected.

(6) A traffic sign that the traffic sign detection unit 42 detects may be an information sign. Such information signs are often installed at sites where roads cross each other vertically, such as a junction. Therefore, it is possible to appropriately determine on which one of roads the vehicle is traveling at a site where the roads cross each other vertically.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

1 Driving assistance device
2 Self-location estimation device
3 External sensor
4 Internal sensor
5 Positioning device
6 Map database
7 Navigation system
10 Actuator
11 Camera
12 Ranging device
13 Wheel speed sensor
14 Gyro-sensor
15 Processor
16 Storage device
17 Steering actuator
18 Accelerator opening actuator
19 Brake control actuator
20 Vehicle
21,22 Road
21a, 21b, 22a, 22b Lane boundary line (white line)
23, 24 Traffic sign
30 Self-location estimation unit
31 Target trajectory setting unit
32 Travel control unit
40 Dead reckoning unit
41 Map matching unit
42 Traffic sign detection unit
43 Coordinate calculation unit
44 Altitude information acquisition unit

The invention claimed is:

1. A self-location estimation method comprising:
   detecting, using an image sensor, a traffic sign in a vicinity of a vehicle;
   determining a current location of the vehicle;
   acquiring, for the traffic sign detected by the image sensor, altitude information of the traffic sign from map data;
   estimating an altitude at which the vehicle is present according to the acquired altitude information of the traffic sign detected by the image sensor;
   determining, when a plurality of roads the altitudes of which are different from each other exist at a two-dimensional coordinate of the current location of the vehicle, on which one of the plurality of roads the traffic sign detected by the image sensor is installed based on the acquired altitude information of the traffic sign detected by the image sensor;
   determining on which one of the plurality of roads the vehicle is present based on which one of the plurality of roads the traffic sign detected by the image sensor is installed;
   setting a target travel trajectory of the vehicle; and
   driving an actuator to operate a steering mechanism of the vehicle such that the vehicle travels on the target travel trajectory.

2. The self-location estimation method according to claim 1 comprising:
   determining the two-dimensional coordinate of the current location in a coordinate system of the map data;
   calculating a two-dimensional coordinate of the detected traffic sign in the coordinate system, based on a two-dimensional coordinate of a relative location of the detected traffic sign and the current location; and
   acquiring altitude information of a traffic sign having two-dimensional coordinate information corresponding to the two-dimensional coordinate of the detected traffic sign from the map data as altitude information of the detected traffic sign.

3. The self-location estimation method according to claim 2 comprising:
   calculating the two-dimensional coordinate of the current location in the coordinate system, using two-dimensional map matching.

4. The self-location estimation method according to claim 1 comprising:
   correcting an estimated value of an altitude at which the vehicle is present, the estimated value being calculated using dead reckoning, according to the altitude information acquired from the map data.

5. The self-location estimation method according to claim 4 comprising:
   correcting the estimated value according to the altitude information acquired from the map data every time the vehicle travels a predetermined distance.

6. The self-location estimation method according to claim 1, wherein the traffic sign is an information sign.

7. The self-location estimation method according to claim 1, wherein the altitude at which the vehicle is present is estimated without performing three-dimensional map matching.

8. The self-location estimation method according to claim 1, wherein identification of the traffic sign for which to acquire the altitude information from the map data is based on detection of the traffic sign by the image sensor.

9. A self-location estimation device comprising:
   an image sensor configured to detect a traffic sign in a vicinity of a vehicle;

an actuator to control a steering mechanism of the vehicle and a controller configured to:
  determine a current location of the vehicle;
  acquire, based on the traffic sign detected by the image sensor, altitude information of the detected traffic sign from map data;
  estimate an altitude at which the vehicle is present according to the acquired altitude information of the traffic sign detected by the image sensor;
  determine, when a plurality of roads the altitudes of which are different from each other exist at a two-dimensional coordinate of the current location of the vehicle, on which one of the plurality of roads the traffic sign detected by the image sensor is installed based on the acquired altitude information of the traffic sign detected by the image sensor;
  determine on which one of the plurality of roads the vehicle is present based on which one of the plurality of roads the traffic sign detected by the image sensor is installed;
  set a target travel trajectory of the vehicle; and
  drive an actuator to operate a steering mechanism of the vehicle such that the vehicle travels on the target travel trajectory.

10. A self-location estimation device comprising:
  an image sensor configured to detect a traffic sign in a vicinity of a vehicle;
  an actuator to control a steering mechanism of the vehicle-vehicle; and
  a controller configured to:
    when a plurality of roads having different altitudes exist at a two-dimensional coordinate of a current location of the vehicle, determine which one of the plurality of roads the vehicle is currently traveling based on altitude information acquired from map data of the traffic sign detected by the image sensor; and
    controlling the vehicle based on a result of the determination of which one of the plurality of roads the vehicle is currently traveling.

11. The self-location estimation device according to claim 10, wherein an altitude at which the vehicle is present is estimated without performing three-dimensional map matching.

12. The self-location estimation device according to claim 10, wherein identification of the traffic sign for which to acquire the altitude information from the map data is based on detection of the traffic sign by the image sensor.

* * * * *